United States Patent
Iwase et al.

(10) Patent No.: US 6,724,492 B1
(45) Date of Patent: Apr. 20, 2004

(54) IMAGE FORMING APPARATUS CAPABLE OF PERFORMING TRIAL PRINTING, AND IMAGE FORMING SYSTEM

(75) Inventors: Akinori Iwase, Yokosuka (JP); Yoshiko Takeda, Yokohama (JP); Kazuhiro Ogura, Kawasaki (JP); Takeshi Ogaki, Tama (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 09/321,828

(22) Filed: May 28, 1999

(30) Foreign Application Priority Data

May 29, 1998 (JP) .......................................... 10-150345

(51) Int. Cl.$^7$ ............................ G06F 15/00; G06K 1/00
(52) U.S. Cl. ...................... 358/1.13; 358/1.15; 358/1.1; 358/1.2; 358/1.3; 358/1.4; 358/1.5; 358/1.6; 358/1.7; 358/1.8; 358/1.9; 358/1.11; 358/1.12; 358/1.14; 358/1.16; 358/1.17; 358/1.18
(58) Field of Search ............................... 358/1.15, 1.13, 358/1.1, 1.2, 1.3, 1.4, 1.5, 1.6, 1.7, 1.8, 1.9, 1.11, 1.12, 1.14, 1.16, 1.17, 1.18

(56) References Cited

U.S. PATENT DOCUMENTS

| 5,321,427 | A | * | 6/1994 | Agar et al. | .................. 347/183 |
| 5,521,710 | A | * | 5/1996 | Strossman et al. | .......... 358/296 |
| 5,718,520 | A | * | 2/1998 | MacKay | ...................... 400/61 |
| 5,801,837 | A |   | 9/1998 | Hamanaka et al. | |
| 5,923,013 | A | * | 7/1999 | Suzuki et al. | ............... 235/375 |
| 5,987,226 | A | * | 11/1999 | Ishikawa et al. | ........... 358/1.13 |
| 6,240,215 | B1 | * | 5/2001 | Salgado et al. | ............. 382/254 |
| 6,288,789 | B1 | * | 9/2001 | Harada | ...................... 358/1.15 |
| 6,353,479 | B1 | * | 3/2002 | Lubawy et al. | ............. 358/1.13 |
| 6,373,586 | B1 | * | 4/2002 | Kim | .......................... 358/1.15 |
| 6,442,358 | B1 | * | 8/2002 | Regelsberger et al. | ........ 399/85 |

FOREIGN PATENT DOCUMENTS

| EP | 0 794 653 | 2/1997 |
| JP | 10-11234 | 1/1998 |

OTHER PUBLICATIONS

Patent Abstracts of Japan, "Image Forming Device", JP 10 291356, Nov. 4, 1998.
Patent Abstracts of Japan, "Page Printer", JP 07 299936, Nov. 14, 1995.
Patent Abstracts of Japan, "Image Forming Device", JP 06 095463, Apr. 8, 1994.
Patent Abstracts of Japan, "Printer", JP 57 153332, Sep. 21, 1982.
Patent Abstracts of Japan, "Printer Controller", JP 10 011234, Jan. 16, 1998.

* cited by examiner

Primary Examiner—Kimberly Williams
Assistant Examiner—Ashanti Ghee
(74) Attorney, Agent, or Firm—Foley & Lardner

(57) ABSTRACT

An image forming apparatus having a receipt interface I/F, a hard disk, and a printer section. The receipt interface I/F receives pages of image data transmitted and a partial print request signal requesting that only a part of the image data be printed, both transmitted through a communication line. The hard disk stores both the image data and the partial print request signal. The printer section prints a part of the image data stored in the hard disk, in response to the partial print request signal that the receipt interface I/F has received.

31 Claims, 14 Drawing Sheets

| 31 | 32 | 33 | 34 | 35 | 36 | 37 | 38 |
|---|---|---|---|---|---|---|---|
| USER ID | JOB NUMBER | DOCUMENT NAME | TRIAL PRINT MODE | TRIAL PRECEDING MODE | PAGE | INITIAL VALUE | PRINT DATA ID |

| QUEUE ORDER 42 | TRIAL PRINT MODE 43 | TRIAL PRECEDING MODE 44 | PAGE 45 | USER ID 46 | JOB NUMBER 47 | DOCUMENT NAME 48 | STATE 49 | RECEIPT DATE-TIME 50 | FILE POINTER 51 |
|---|---|---|---|---|---|---|---|---|---|
| 1 | ORDINARY | | | A | 1111 | WORD-PROCESSED | PRINTING PROCEEDING | 1998-2-16:14:01:01 | 00011 |
| 2 | TRIAL | PRE-PRINTING | 3 | B | 0032 | SPREADSHEET | PRINTING STANDBY | 1998-2-16:14:01:30 | 00020 |
| 3 | TRIAL | TRIAL PRINT INDICATION | 2 | B | 0033 | WORD-PROCESSED | PRINTING STANDBY | 1998-2-16:14:01:35 | 00025 |
| 4 | TRIAL | NORMAL | | A | 1200 | WORD-PROCESSED | PRINTING STANDBY | 1998-2-16:14:02:30 | 00030 |
| 5 | ORDINARY | | | B | 0034 | SPREADSHEET | PRINTING STANDBY | 1998-2-16:14:03:01 | 00035 |
| 6 | TRIAL | NORMAL | | A | 1250 | WORD-PROCESSED | PRINTING STANDBY | 1998-2-16:14:03:30 | 00040 |
| 7 | TRIAL | TRIAL PRINT INDICATION | 2 | A | 1260 | SPREADSHEET | PRINTING STANDBY | 1998-2-16:14:05:30 | 00045 |
| ... | ... | ... | ... | ... | ... | ... | ... | ... | ... |

| USER ID | USER FULL-NAME | PASSWORD |
|---------|----------------|----------|
| A | IWASE, AKINOBU | 123456 |
| B | OOGAKI, TAKESHI | 234567 |
| C | TAKEDA, YOSHIKO | 345678 |
| D | OGURA, KAZUMI | 456789 |
| ⋮ | ⋮ | ⋮ |

LIST OF JOBS OF
USER B TO BE DELETED ~330

| JOB NUMBER | DOCUMENT NAME | DATE OF RECEIPT |
|---|---|---|
| 0032 | SPREAD SHEET | 1998-2-16 : 14 : 01 : 30 |
| 0033 | WORD-PROCESSED | 1998-2-16 : 14 : 01 : 35 |
| 0034 | SPREAD SHEET | 1998-2-16 : 14 : 03 : 30 |

( DELETE ) ~332

| PATH/FILE NAME | ISSUE DATE | DOCUMENT NAME | SET VALUE |
|---|---|---|---|
| C : /tmp/test1 | 1998-2-16 : 14 : 01 : 30 | SPREAD SHEET | |
| C : /tmp/test2 | 1998-2-16 : 14 : 01 : 35 | WORD-PROCESSED | |
| C : /tmp/test3 | 1998-2-16 : 14 : 03 : 30 | SPREAD SHEET | |
| ⋮ | ⋮ | ⋮ | |

| QUEUE ORDER | TRIAL PRINT MODE | TRIAL PRECEDING MODE | PAGE | USER ID | JOB NUMBER | DOCUMENT NAME | STATE | RECEIPT DATE-TIME | PC ADDRESS | FILE POINTER |
|---|---|---|---|---|---|---|---|---|---|---|
| 1 | ORDINARY | | | A | 1111 | WORD-PROCESSED | PRINTING PROCEEDING | 1998-2-16:14:01:01 | PC1 | 00011 |
| 2 | TRIAL | PRE-PRINTING | 3 | B | 0032 | SPREADSHEET | PRINTING STANDBY | 1998-2-16:14:01:30 | PC2 | 00020 |
| 3 | TRIAL | TRIAL PRINT INDICATION | 2 | B | 0033 | WORD-PROCESSED | PRINTING STANDBY | 1998-2-16:14:01:35 | PC2 | 00025 |
| 4 | TRIAL | NORMAL | | A | 1200 | WORD-PROCESSED | PRINTING STANDBY | 1998-2-16:14:02:30 | PC1 | 00030 |
| 5 | ORDINARY | | | B | 0034 | SPREADSHEET | PRINTING STANDBY | 1998-2-16:14:03:01 | PC2 | 00035 |
| 6 | TRIAL | NORMAL | | A | 1250 | WORD-PROCESSED | PRINTING STANDBY | 1998-2-16:14:03:30 | PC1 | 00040 |
| 7 | TRIAL | TRIAL PRINT INDICATION | 2 | A | 1260 | SPREADSHEET | PRINTING STANDBY | 1998-2-16:14:05:30 | PC1 | 00045 |
| ... | ... | ... | ... | ... | ... | ... | ... | ... | ... | ... |

FIG. 23

IMAGE FORMING APPARATUS CAPABLE OF PERFORMING TRIAL PRINTING, AND IMAGE FORMING SYSTEM

BACKGROUND OF THE INVENTION

The present invention relates to a printing apparatus and a printing system, such as a shared printer and a digital printing system, which receive data from a plurality of clients though, for example, a local area network (LAN) or the like.

Recently, more and more office automation (OA) apparatuses have been connected to a LAN and used. Personal computers (PCs) and the like are also connected to a LAN, and data is exchanged between them. In many cases, a plurality of PCs share one printer, not each PC having one printer connected to it. Each PC may receive data from any other PC in the network and transmits it to the shared printer in the network, whereby the shared printer prints the data. Another PC called "server" is provided in the network to control data that is to be transmitted to the shared printer.

Upon receipt of pieces of print data from a plurality of PCs, the server stores them into a queue. The printer then prints pieces of data sequentially, in the order they have been input to the queue. Namely, the printer performs so-called "first in, first out" process.

Jpn. Pat. Appln. KOKAI Publication No. 10-11234 discloses the technique of storing data into a queue and processing, thereby to alter the setting of particular print data.

More specifically, one printer is connected two or more PCs by a LAN. The printer can therefore receive pieces of print data from the plurality of PCs. Thus, one printer is shared by a plurality of PC users. In addition, the printer and the PCs can be arranged more freely than otherwise. For example, each PC user can put the PC on his or her desk, while the shared printer can be installed at any place the PC users have agreed on.

A problem will arise, however, if the printer and the PC are arranged so. Some users may have their PCs located relatively near the printer, but some others inevitably have their PCs located far from the printer. The PC users of the latter group have to walk a long distance to take the printed sheets at the shared printer.

To make matters worse, the user may find that the printed sheets are of lower quality than he or she really wants. For example, the hatching over some printed characters in a word-processed document happens to be darker or lighter than is desired. In this case, the user needs to print the data again and, hence, must walk back to his or her PC. The user must reset the various print instructions on the PC, then push the print button, and walk again all the way to the shared printer to take the new printed sheets.

Thus, the user may need to spend much time to get desirable printed sheets if his PC is located far from the shared printer and if the sheets printed first by the printer are undesirable ones, compelling him or her to walk back to the PC and reset the print instructions on the PC.

As mentioned above, in a system comprising one printer and a plurality of PCs, each PC user needs to walk to the printer to get printed sheets unless the printer is installed just beside his or her PC. Moreover, if the printed sheets are of undesirable quality, the PC user must walk back to his or her PC to reset the print instructions and push the print button, and must walk again to the printer to take the sheet printed for the second time. As a consequence, the PC user cannot get desirable print sheets quickly.

BRIEF SUMMARY OF THE INVENTION

The object of the present invention is to provide a printing apparatus and a printing system, the system comprising at least one printing apparatus and a plurality of personal computers and which enables each user to reset print instructions at the printing apparatus to get printed sheets of the quality the user desires.

According to the invention there is provided an image forming apparatus which comprises: receiving means receiving a plurality of pages of image data transmitted through a communication line and receiving a partial print request signal requesting that only a part of the image data be printed; storage means for storing the image data and the partial print request signal, both received at the receiving means; and printing means for printing a part of the image data in response to the partial print request signal stored in the storage means.

The image forming apparatus, or the printer, prints at least a part of the image data, not all the image data transmitted an image data processing device through the communication line as in the conventional printing system.

The user examines the printed sheets and, if necessary, changes the print values by operating the control panel provided on the printer. Then, the user operates the control panel to have all image data printed at the printer.

Thus it can be prevented that all pages printed in accordance with print values all set at a personal computer turn out to have undesirable quality as may happen in the conventional printing system. That is, all pages can be printed only when the user checks at least one page printed for trial and then changes, if necessary, the print values to desired ones on the control panel of the printer. This helps the user to have sheets printed in the desired quality, with ease and reliability.

Therefore, the user need not repeatedly walk between his or her personal computer and the printer, to check the print quality and change the print values, as in the conventional printing system. Thus, the present invention provides a printing system that enables the user to get quickly printed sheets of desired quality.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a table showing an example of the queue management table provided in the digital copier;

FIG. 19 is a diagram showing a still another menu displayed on the display-input section of the control panel of the digital copier;

FIG. 20 is a diagram showing a different menu displayed on the display-input section of the control panel of the digital copier;

FIG. 21 is a diagram showing another menu displayed on the display-input section of the control panel of the digital copier;

FIG. 22 shows the driver management table incorporated in a personal computer; and FIG. 23 illustrates an example of the queue management table incorporated in the digital copier.

DETAILED DESCRIPTION OF THE INVENTION

Embodiments of the present invention will now be described, with reference to the accompanying drawings.

Figure 1:
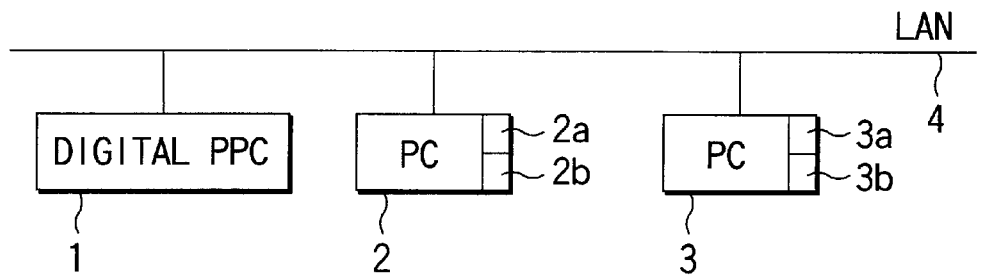
FIG. 1 is a diagram schematically showing a printing system having a digital copier according to the present invention.

FIG. 1 shows a printing system according to the invention. The system comprises a digital copier (PPC) 1, a plurality of personal computers (PCs) 2 and 3, and a local area network (LAN) 4. The PPC 1 is used as a printer in the system. The LAN 4 connects PCs 2 and 3 to the PPC 1. The PCs 2 and 3 are of the ordinary type. Each can transmit print data to the digital copier 1. The digital copier 1 receives the print data from any PC and prints the data.

The PC 2 has a display section 2a and a keyboard 2b. Similarly, the PC 3 has a display section 3a and a keyboard 3b.

The first embodiment of the invention will be described below.

Figure 2:
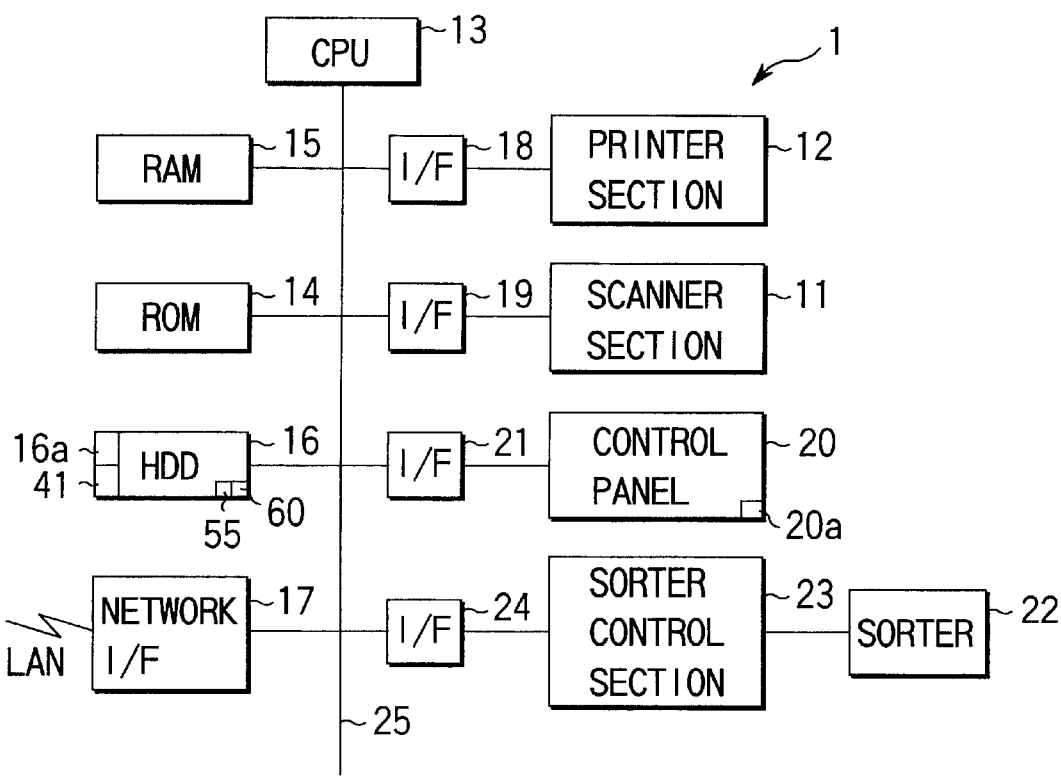
FIG. 2 is a diagram schematically depicting the digital copier.

FIG. 2 is a schematic representation of the digital copier 1, which is the first embodiment of the present invention. As shown in FIG. 2, the digital copier 1 comprises a scanner section 11 and a printer section 12. When the copier 1 is used as an ordinary copying apparatus, the scanner read an image signal from an original document, and the image signal is supplied to the printing section 12. The printer section 12 prints the image represented by the image signal. The scanner section 11 has a CCD sensor (not shown). The CCD sensor converts the light reflected from the original document into an electric image signal. The printer section 12 is an electro-photographic device. It prints the image represented by the signal, on a sheet of paper. The printer section 12 may be replaced with an ink-jet printer.

The digital copier 1 further comprises a CPU (Central Processing Unit) 13, a ROM 14 (Read Only Memory) 14, a RAM (Random Access Memory) 15, a hard desk drive (HDD) 16, a network interface (I/F) 17, a printer interface (I/F) 18, a scanner interface (I/F) 19, a control panel 20, a control panel interface (I/F) 21, a sorter 22, a sorter control section 23, and a sorter control interface (I/F) 24. The CPU 13 controls the other components of the digital copier 1. The ROM 14 stores operating software. The RAM 15 is provided to store temporarily image data and other data for operating the other components of the copier 1. The HDD 16 is used to store various kinds of data. The network interface 17 transfers signals between the LAN 4 and the other components of the copier 1. The printer interface 18 receives signals to and supplies signals to the printer section 12. The scanner interface 19 receives signals to and supplies signals to the scanner section 11. The control panel 20 receives various instructions and displays them when operated by a user. The control panel interface 21 receives signals to and supplies signals to the control panel 20. The sorter 22 sorts printed paper sheets into bins so that the sheets in the same bin may be stapled into a copy of document. The sorter control section 23 controls the sorter 22. The sorter control interface 24 receives signals to and supplies signals to the sorter control section 23.

The control panel 20 has a display-input section 20a. The display-input section 20a is designed to display and input data, as will be described later in greater detail.

The digital copier 1 has a bus 25. The bus connects the CPU 13 to the ROM 14, RAM 15, HDD 16, network interface 17, printer interface 18, scanner interface 19, control panel interface 21 and sorter control interface 24. Signals are transferred through the bus 25 between the components 13–19, 21 and 24.

Figures 3, 4:
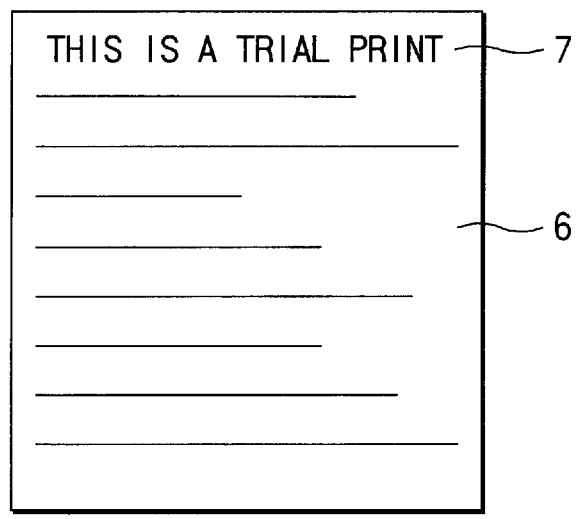
FIG. 3 is a diagram illustrating an example of data to be transmitted from a personal computer to the digital copier.
FIG. 4 is an image of a paper sheet printed for trial.

FIG. 3 illustrates the data, which is transmitted from the PC 2 in the LAN 4 to the digital copier 1 when the PC 2 gives a print request to the digital copier 1. This data consists of a user ID field 31, a job number field 32, a document name field 33, a trial print mode field 34, a trial preceding mode field 35, a page field 36, an initial value field 37, and a print data ID field 38.

To use the PC 2, the user performs log-in procedure, inputting the user data into the PC 2 to identify himself or herself. The user ID based on the user data is recorded in the user ID field 31. The user ID is the code of the person who wishes to have data printed by the digital copier 1. The PC 2 may give several print requests to the digital copier 1. In this case, it is necessary to manage the print requests. To this end, serial numbers are assigned to the print requests. Each print request shall be called "job" hereinafter. The serial numbers are recorded in the job number field 32 and will be transmitted from the PC 2 to the digital copier 1.

In the document name field,33, the name of the job is recorded. The job name is assigned by the software used on the PC 2 to make the print request. The job name will be changed to one that depends on the software.

The fields that characterize the present invention are the trial print mode field 34, the trial preceding mode field 35, and the page field 36.

In the trial print mode-field 34, either "normal"or "trial" is recorded. "Normal" indicates that normal printing has been designated. If the job is "normal," the digital copier 1 will print data in the same way as ordinary printers. If "trial" is recorded in the trial print mode field 34, the printer section 12 will print data for trial. To effect trial printing, the job is set in the print queue 16a provided in the HDD 16, whereby the data is printed for trial.

In the trial preceding mode field 35, either "normal" or "pre-printing, trial print indication" is recorded. These values indicate the types of trial print modes. In the page field 36, the page to be printed for trial is recorded if "trial" and "pre-printing, trial print indication" are recorded in the trial print mode filed 34 and the trial preceding mode field 35, respectively. In this case, the page is set in the print queue 16a of the HDD 16. If "normal" is recorded in the trail print mode filed 34, the values recorded in the trial preceding mode field 35 and page field 36 will be neglected. If "trial" and "normal" are recorded in the trail print mode filed 34 and the trial preceding mode field 35, respectively, the value recorded in the page field 36 will be neglected.

The trial print mode will be described in greater detail.

This print mode is classified into the following three sub-modes:

(1) Normal mode of trail printing
(2) Pre-print mode of trail printing
(3) Pre-print display mode of trial printing These sub-modes will be explained below.

(1) To print data in the normal mode of trial printing, the user operates the PC 2, setting this sub-mode. Then, the data shown in FIG. 3 is transmitted to the digital copier 1. In the digital copier 1, the data is stored into the print queue 16a of the HDD 16. The user cannot get the data printed, merely by storing it into the print queue 16a. To have the data printed, he or she has to walk to the digital copier 1 and operate the control panel 20 of the copier 1 to designate the page he or she wants to print.

The user examines the data printed for trial on paper sheets, to see whether the data has been printed in desired quality (i.e., the print density and the like). If the data has not been printed as he or she desires, the user operates the control panel 20 and gets the data printed for trial, repeatedly, until he or she obtains the data printed in the very quality he or she desires.

(2) To print data in the pre-print mode of trail print, the user operates the PC 2, setting this sub-mode and designating the page he or she wants to have printed for trail. Then, the data shown in FIG. 3 is transmitted to the digital copier 1. In the digital copier 1, the data is stored into the print queue 16a of the HDD 16. When the job is assigned to the printing of the data in the print queue 16a, the digital copier 1 prints the designated page of the data. Thus, the job is performed while the user is walking to the copier 1, and the user can examine the data printed no paper sheets upon arriving at the digital copier 1. If the data has not been printed as desired, the user operates the control panel 20 and gets the data printed for trial, repeatedly, as in the normal mode of trial printing, until he or she obtains the data printed in the very quality he or she desires.

(3) In the pre-print display mode, the user operates the PC 2, setting this sub-mode, whereby the digital copier 1 prints the designated page of the data while the user is walking to the copier 1, as in the pre-print mode of trail print. In the pre-print display mode differs from the digital copier 1 in that a sentence 7 is automatically printed at the head of each paper sheet 6 as is illustrated in FIG. 4, indicating that the sheet is a trial print. The sentence 7 may be replaced with a mark and may be printed at any part of the paper sheet 6. The sentence 7 may be replaced with the user ID, the user name, the job number, the document name, or the like. If this is case, it will be easy for the user to identify the job for which the trial printing has been made.

Management of print jobs and processing thereof will be described in detail.

When the digital copier 1 receives from the PC 2 a print request which includes the data shown in FIG. 3, the data is stored into the print queue 16a provided in the HDD 16. FIG. 5 shows an example of the queue management table 41 stored in the print queue 16a. Instead, the queue management table 41 may be stored in the RAM 15 if it is small and the RAM 15 has a large storage capacity.

The queue management table 41 shown in FIG. 5 consists of a queue order field 42, a trial print mode field 43, a trial preceding mode field 44, a page field 45, a user ID field 46, a job number field 47, a document name field 48, a state field 49, a receipt date-time field 50, and a file pointer field 51.

When received at the digital copier 1, the data shown in FIG. 3 is stored into the queue management table 41. In the queue order field 42, the numbers of jobs are stored in the order the jobs are to be executed. Thus, the job of number 1 will be executed first. In the trial print mode field 43, the value recorded in trial print mode field 34 is recorded. In the trial preceding mode field 44, the value recorded in the trial preceding mode field 35 (FIG. 3) is recorded. In the page field 45, the value recorded in the page field 36 (FIG. 3) is recorded. In the user ID field 46, the value recorded in the page field 36 (FIG. 3) is recorded. In the job number field 47, the value recorded in the job number field 32 (FIG. 3) is recorded.

In the document name field 48, the value recorded in the document name field 33 (FIG. 3) is recorded. In the state field 49, the value showing the state of the job is recorded. More precisely, either "printing proceeding" or "printing standby" is stored in the state field 49. In the receipt date-time field 50, the date of receiving the data of the job is stored. In the file pointer field 51, pointer data for the file, which contains the values recorded in the initial value field 37 and print data ID field 38, respectively, is stored.

Figures 6, 7:
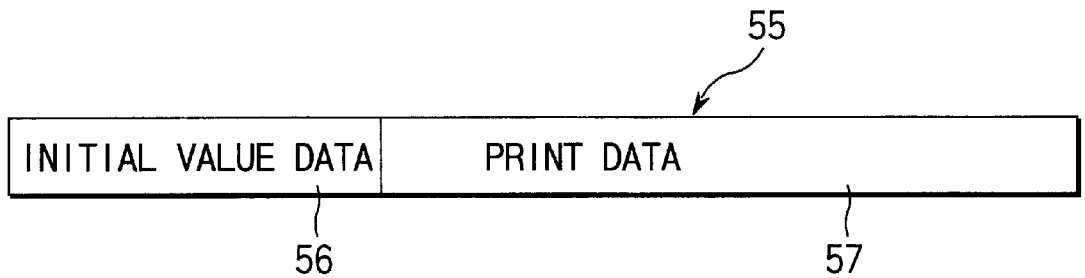
FIG. 6 is a diagram illustrating an example of data to be printed.
FIG. 7 shows an example of a user management table.

In the present embodiment, the values recorded in the initial value field 37 and print data ID field 38, both shown in FIG. 3, are combined into one file 55, and the name of this file 55 is stored into the file pointer field 51 shown in FIG. 5. FIG. 6 is a schematic representation of this file 55. The file 55 consists of initial value data 56 and print data 57 and is stored in the HDD 16 incorporated in the digital copier 1.

As indicated above, any specified job recorded in the queue management table 41, such as trial printing, can be carried out in the digital copier 1 by operating the control panel 20. To enhance the security of the print data, the HDD 16 stores a password table in which user IDs and passwords for the user IDs are recorded.

FIG. 7 shows the password table 60. The password table 60 is composed of a user ID field 61, a user full-name field 62, and a password field 63. In the user ID field 61, user IDs are stored. In the user full-name field 62, the full names of the users assigned with the user IDs are stored. In the password field 63, the passwords assigned to the users are stored. Since the full names of the users and the like are difficult to input at the control panel 20 of the digital copier 1, the password table 60 is prepared as a file in the PC and transmitted to the digital copier 1 by using file transfer protocol. The password table 60 is thereby stored into the HDD 16 of the digital copier 1.

The operation of the digital copier 1 will now be described. Many tasks are performed in the digital copier 1. Of these tasks, the printing routine, the trial printing routine and the job-deleting routine will be explained in detail.

Figure 8:
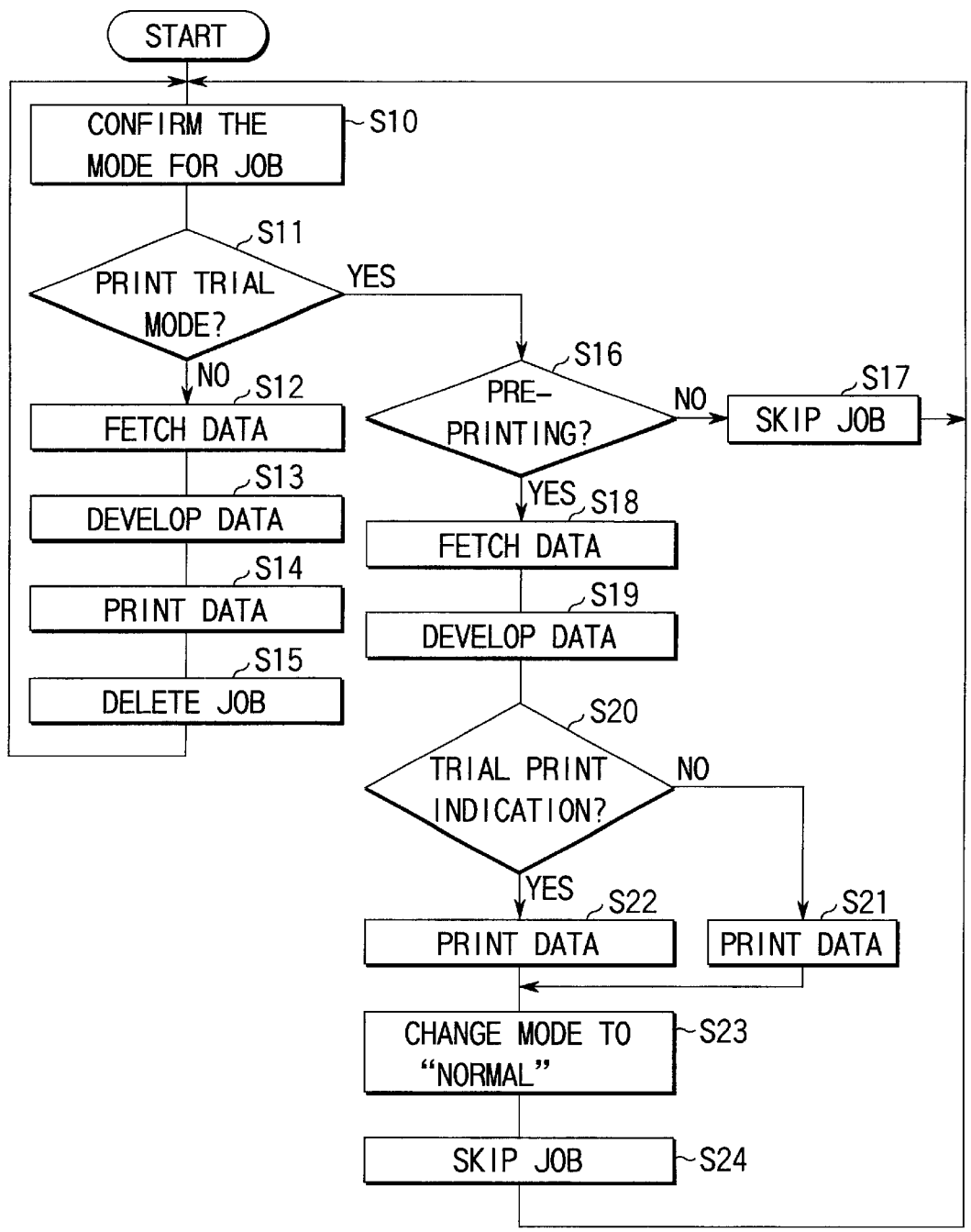
FIG. 8 is a flow chart explaining the ordinary printing that the digital copier performs.

FIG. 8 is a flow chart explaining the printing routine. First, the job having the smallest serial number is read from the queue order field 42 of the queue management table 41, and the mode for the job, which is recorded in the trial print mode field 43 of the table 41, is confirmed (Step S10). Then, it is determined whether the mode recorded in the trial print mode field 43 is the trial print mode (Step S11).

If the mode recorded in the trial print mode field 43 is "normal," not "trial," the name of the file, in which the ID and initial value of the print data are recorded, is fetched from the file pointer field 51 (Step S12). The print data is developed into image data in the RAM 15 so as to be printed (Step S13). The image data is supplied via the printer interface 18 to the printer section 12, which prints the image data on paper sheets (Step S14). Upon completion of the printing at the printer section 12, the file in which the ID and initial value of the print data are recorded is deleted, and the job is deleted from the queue management table 41 (Step S15). Thereafter, the operation returns to Step S10. In Step S10, the job having the second smallest serial number is read from the queue order field 42, and the mode for this job is confirmed.

If it is determined in Step S11 that the mode recorded in the trial print mode field 43 is "trial," the trial preceding mode field 44 of the queue management table 41 is checked to see if the mode is "pre-printing" or "trial print indication" (Step S16). If the mode is "normal," not "pre-printing" or "trial print indication," the job is skipped (Step S17), and the operation returns to Step S10. In Step S10, the job having the third smallest serial, number is read from the queue order field 42, and the mode for the job is confirmed.

If it is determined in Step,S16 that the mode is either "pre-printing" or "trial print indication," the name of the file in which the ID and initial value of the print data are recorded is fetched from the file pointer field 51 (Step S18). The print data is developed into image data in the RAM 15 so as to be printed (Step S19). Next, it is determined whether the value recorded in the trial-preceding mode field 44 is "trial" or not (Step S20).

If the value in the trial preceding mode field 44 is either "pre-printing" or "trial print indication," the image data of the page designated by the value recorded in the page field 45 is-supplied via the printer interface 18 to the printer section 12. The printer section 12 prints this image data for trial on paper sheets (Step S21). If the value in the trial preceding mode field 44 is "trial," the image data of the page designated by the value recorded in the page field 45 is developed in the RAM 15, and a mark indicating that the data is printed for trial is added to the image data. The image data containing the mark is supplied via the printer interface 18 to the printer section 12, which prints this image data for trial on paper sheets (Step S22).

The operation goes to Step S23, in which the value in the trial preceding mode field 44, which is "pre-printing" or "trial print indication," is changed to "normal." The job is skipped (Step S24), and the operation returns to Step S10. In Step S10, the job having the fourth smallest serial number is read from the queue order field 42, and the mode for the job is confirmed.

Figure 9:
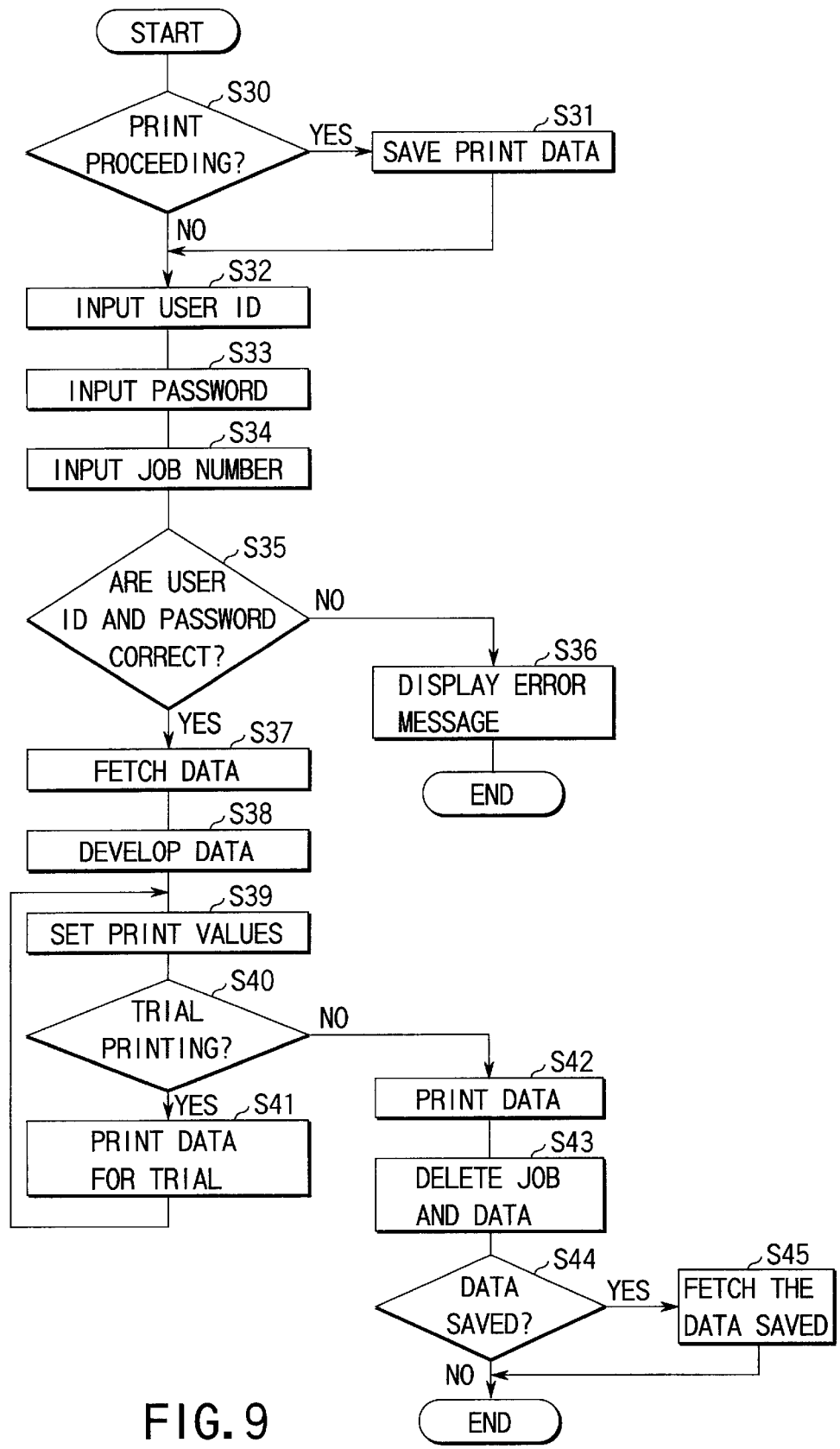
FIG. 9 is flow chart explaining the trial printing that the digital copier performs.

FIG. 9 is a flow chart explaining the trial printing routine. The trial printing routine is started when the user walks to the digital copier 1 and operates the display-input section 20a of the control panel 20, thereby selecting the trial print mode.

First, it is determined whether or not the printer section 12 of the digital copier 1 is printing a job (Step S30). If the section 12 is printing a job, the print data of the job is saved temporarily so that it may be printed later (Step S31). To be more specific, the various values set, print data and the number of pages already printed are stored, in the form of a file, into the HDD 16 of the digital copier 1.

Next, the user operates the display-input section 20a of the control panel 20, inputting his or her user ID (Step S32). The user then operates the display-input section 20a, inputting his or her password (Step S33). The user further operates the display-input section 20a, inputting the number of the job he or she wants to print for trial (Step S34). The queue management table 41 and the password table 60 are checked to determine whether the user ID and the password, thus input, are correct ones (Step S35). If the user ID or the password, or both are not correct, this fact will be indicated on the display-input section 20a of the control panel 20 (Step S36). Thus ends the trial printing routine.

If it is determined in Step S35 that the user ID and the password are correct, the name of the file, in which the ID and initial value of the print data are recorded, is fetched from the file pointer field 51 (Step S37). The print data is developed into-image data in the RAM 15 so as to be printed (Step S38).

Then, the user operates the display-input section 20a, setting various print values (Step S39). These print values are print density, sorting mode, stable mode, stapling position, double-side print, number of copies, and the like. To print color images, additional print values, such as color saturation, color balance, and the like, must be input. Also in Step S39, the page of data to be printed for trial can be designated.

Next, it is determined whether or not the trial printing has been designated, or whether a trial printing button displayed on the display-input section 20a has been selected (Step S40). If YES, that is, if the trial print button has been selected, the image data of the pages, which are designated by the values set in Step S39 and which are to be printed, is supplied through the printer interface 18 to the printer section 12. The printer section 12 prints only the designated page of image data for trial on paper sheets (Step S41). Then, the operation returns to Step S39. After examining the quality of the image printed for trial, the user can set, if necessary, different print values to have the same image data printed in more desirable quality.

If NO in Step S40, that is, if the print button displayed on the display-input section 20a has been selected, all pages of image data are supplied via the printer interface 18 to the printer section 12. The printer section 12 prints all pages of image data on paper sheets in accordance of the print values set in Step S39 (Step S42).

Upon completion of the printing at the printer section 12, the file in which the ID and initial value of the print data are recorded is deleted, and the job is deleted from the queue management table 41 (Step S43). It is then determined whether data has been saved in Step S31 in any file (Step S44). If there is data saved, the data is fetched from the file, and the job interrupted at the start of the trial printing routine is resumed (Step S45). Thus, the trial printing routine does end.

Figure 10:
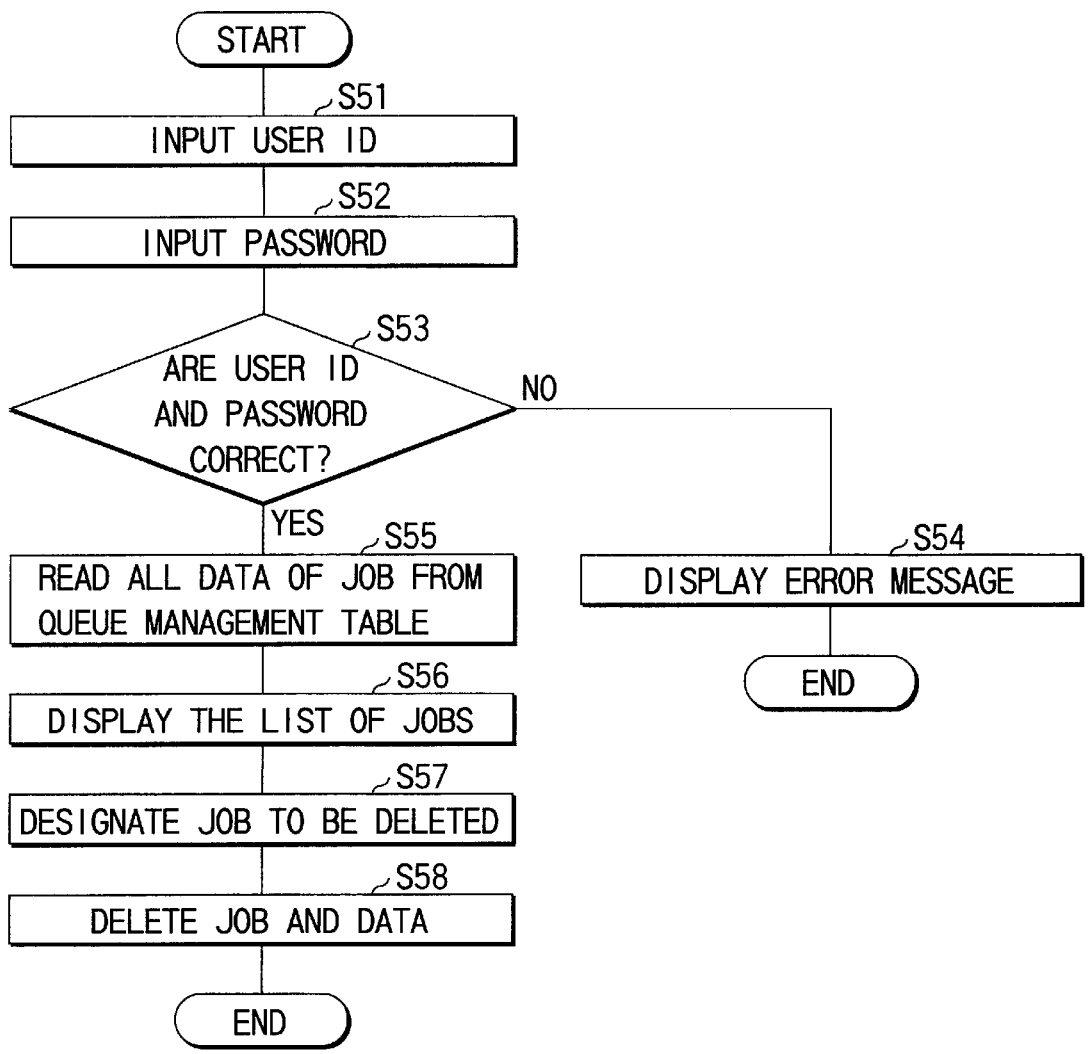
FIG. 10 is a flow chart explaining the job deletion that the digital copier performs.

The job-deleting routine will be described, with reference to the flow chart of FIG. 10. This routine is initiated when the user comes to the digital copier 1 and operates the display-input section 20a of the control panel 20, thereby selecting the job-deleting mode.

First, the user operates the display-input section 20a, inputting his or her user ID (Step S51). The user then operates the display-input section 20a, thereby inputting his or her password (Step S52). It is then determined whether the user ID and the password are correct or not (Step S53). If the user ID and the password are not correct, this fact is displayed on the display-input section 20a of the control panel 20 (Step S54). The job-deleting routine ends.

If it is determined in Step S53 that the user ID and the password are correct, all data of the job is read from the queue management table 41 (Step S55). The job data is displayed in the form of a table on the display-input section 20a of the control panel 20 (Step S56). Seeing the job data displayed, the user operates the display-input section 20a designating the job to be deleted (Step S57). Then, the file containing the initial value and print data of the job and the job itself are deleted from the queue management table 41 (Step S58). Thus ends the job-deleting routine.

Figure 11:
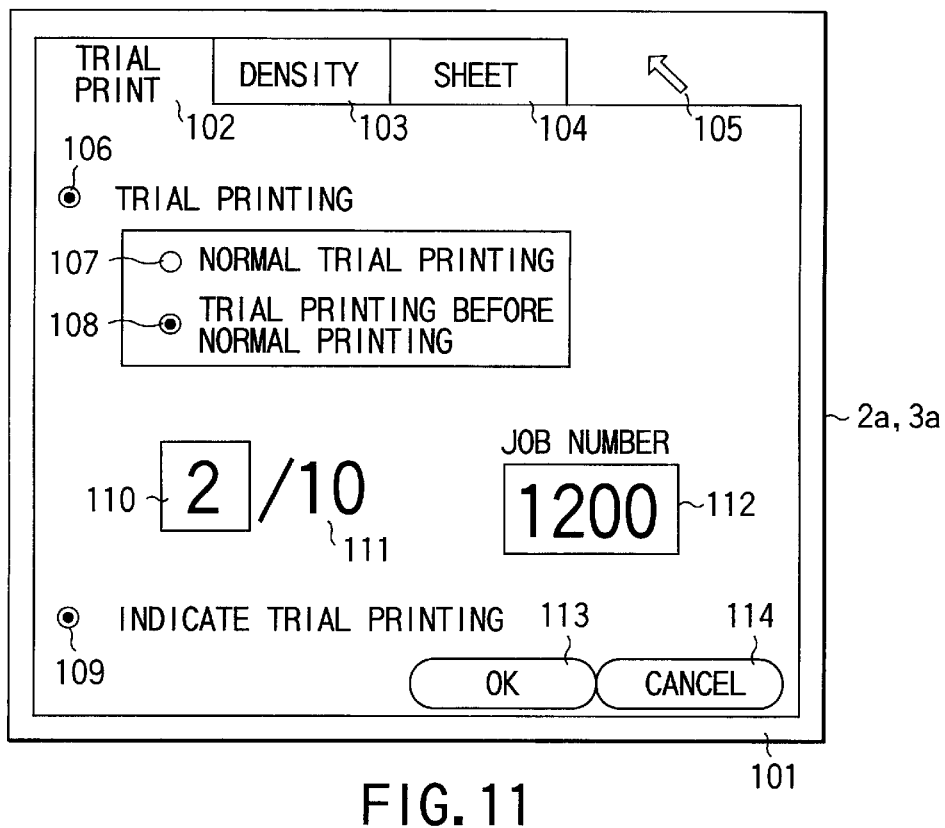
FIG. 11 is a diagram showing an example of windows displayed on the digital copier.

FIG. 11 shows a window 101 which is displayed on the display section 2a of the PC 2, which is used to set the trial print mode on the PC 2.

This window 101 is displayed to set print values for the digital copier 1, while the PC 2 is using software. Hence, the window 101 is displayed by the use of the driver software installed in the PC 2 for driving the digital copier 1.

Shown in the window 101 are a trial print tab 102, a density-adjusting tab 103, and a sheet-selecting tab 104. The trial print tab 102 is used to designate trial printing. The density-adjusting tab 103 is used to adjust the print density. The sheet-selecting tab 104 is used to select sheets of a desired size. One of these tabs 102, 103 and 104 is selected by moving a pointer 105 to the tab and clicking a mouse (not shown).

If the trial print tab 102 is selected to make the digital copier 1 print data for trial, check buttons 106 to 109, page input area 110, all-page area 111, job number area 112, OK button 113, and cancel button 114 will be displayed in the window 110. The check button 106 is selected to designate trial printing, a check button 107 to designate the normal mode of trail printing, a check button 108 to designate the pre-print mode of trial printing, and a check button 109 to designate pre-print display mode of trial printing. The page of data to be printed for trial is displayed in the page input area 110. The number of all pages to be printed is displayed in all-page area 111. The number of the job is displayed in the job number area 112.

In order to print the data for trial, the user moves the pointer 105 to the check button 106 and clicks the mouse, thus setting the digital copier 1 in the trial print mode. Unless or until the check button 106 is thus activated, the other check buttons 107, 108 and 109 and the areas 110 and 112 remain invalid.

While the check button 106 is active, only one of the check buttons 107 and 108 can be activated. If the check button 107 is activated, the pre-print mode of trail printing cannot be set, the area 110 cannot be selected, and the check button 109 cannot be activated.

If the check button 108 is activated, the trial printing precedes the normal printing. In this case, the area 110 can be selected and the check button 109 can be activated. While the check button 108 remains active, the user may operate the keyboard 3a of the PC 2, inputting the page he or she wishes to get printed for trial and displaying the page in the area 110. If so, the number of all pages of the document is displayed in the area 111. Any one of the pages displayed in the area 111 can be designated and printed for trial.

While the check button 108 remains active, the check button 109 can be activated to designate the printing of a mark indicating that the data is printed for trial, as illustrated in FIG. 4, along with the image data printed in the pre-print display mode of trial printing. Unless the check button 108 is activated, the mark cannot be printed.

Every time the digital copier 1 receives a print job, it issues a serial number for the job to the PC 2. This serial number is displayed in the job number area 112. The serial number is a decimal four-digit number, which is easy to learn. When the digital copier 1 receives a print job after the serial number has reached "9999," the serial number will change to "0001."

The OK button 113 is selected by clicking the mouse while the pointer 105 is pointing this button 113, after all values have been set for trail printing as described above. The cancel button 114 is selected by clicking the mouse while the pointer 105 is pointing the button 114, thereby to cancel all values that have been set for trial printing.

Various menus, which the display-input section 20a of the control panel 20 provided on the digital copier 1 can display, will now be described.

Figure 12:
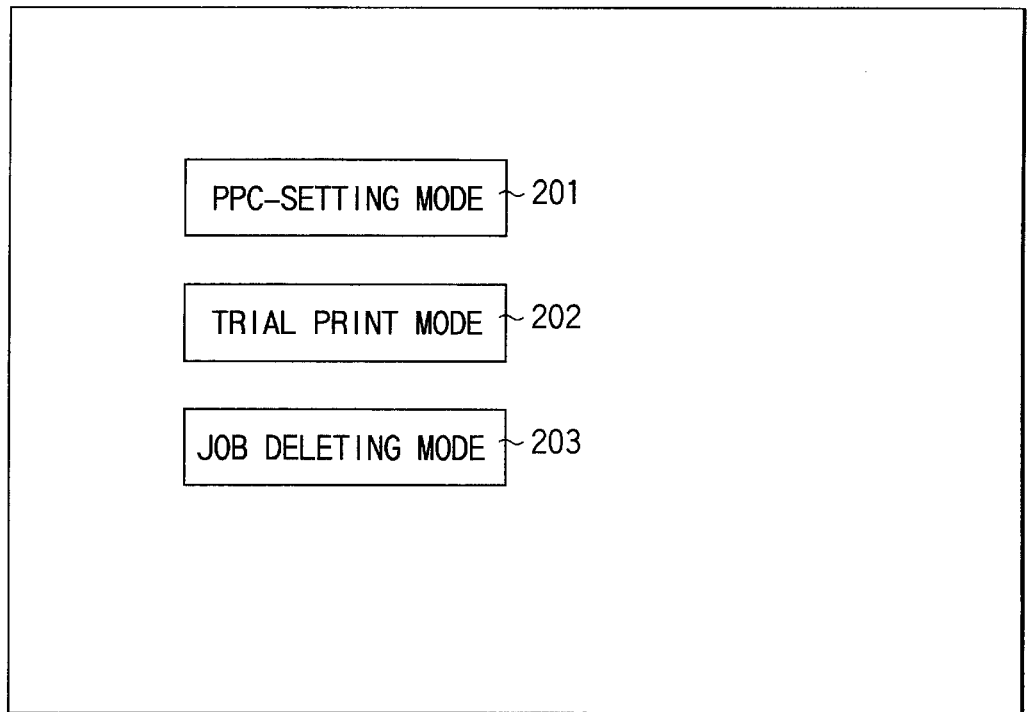
FIG. 12 is a diagram depicting a menu displayed on the display-input section of the control panel of the digital copier.

FIG. 12 depicts the initial menu displayed on the display-input section 20a. That is, a PPC-setting button 201, a trail printing button 202, and a job-deleting button 203 are displayed on the display-input section 20a when the power switch of the digital copier 1 is turned on. The PPC-setting button 201 is touched to use the copier 1 as an ordinary one and set various print instructions. The print instructions are set in the known manner and will not be described. The job-deleting button 203 is touched to delete the job from the queue management table 41.

The trial printing button 202 will be described. After designating the trial printing by selecting the buttons displayed on the display section 2a and by operating the key board 3a, the user comes to the digital copier 1. The user touches the trial printing button 202 displayed on the display-input section 20a. As a result, the display-input section 20a displays the menu shown in FIG. 13.

Figure 13:
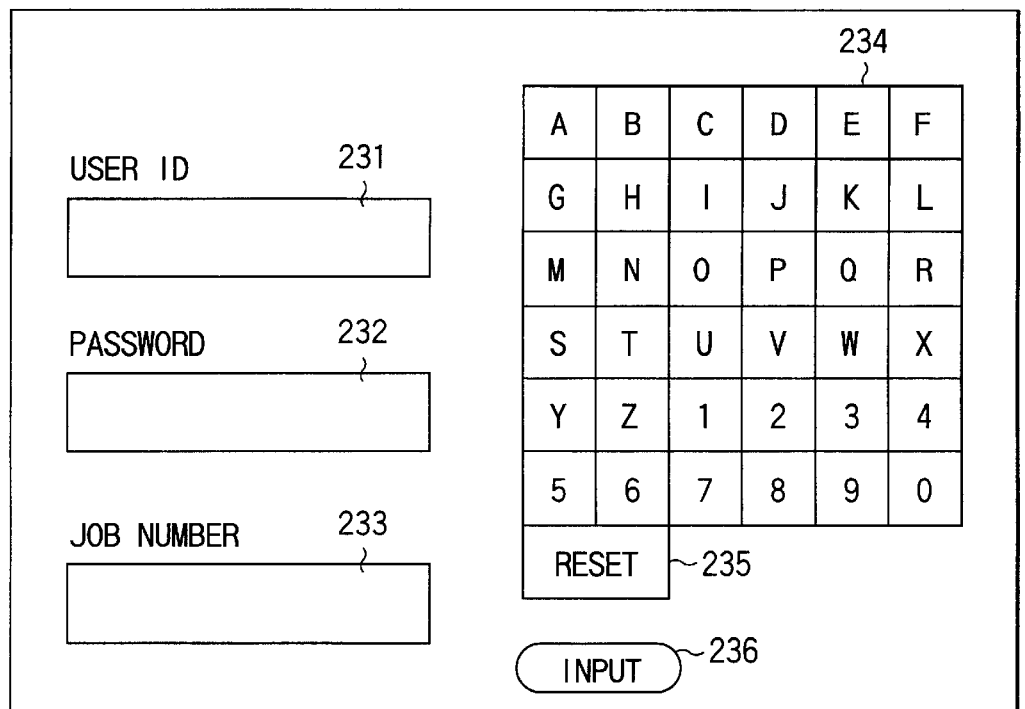
FIG. 13 is a diagram showing another menu displayed on the display-input section of the control panel of the digital copier.

As shown in FIG. 13, this menu consists of a user ID area 231, a password area 232, a job number area 233, a character key pad 234, a reset button 235, and an input button 236.

First, the user inputs his or her user ID in the area 231, by touching the selected keys of the character keypad 234. If the user makes a wrong user ID, he or she touches the reset button 235, thereby clearing the wrong user ID. After inputting the user ID in the area 231, the user touches the input button 236. Then, the user touches the selected keys of the character key pad 234, thereby inputting his or her password. The password is not displayed in the password area 232. Rather, a prescribed number asterisks.(*) or underline bars (_) are displayed in the password area 232. After inputting password, the user touches the input button 236. Then, the user touches the selected keys of the character key pad 234, inputting the job number in the job number area 233. Finally, the user touches the input button 236. If the user has input a wrong job number, an error message will be displayed, and he or she can perform no further operations.

Figure 14:
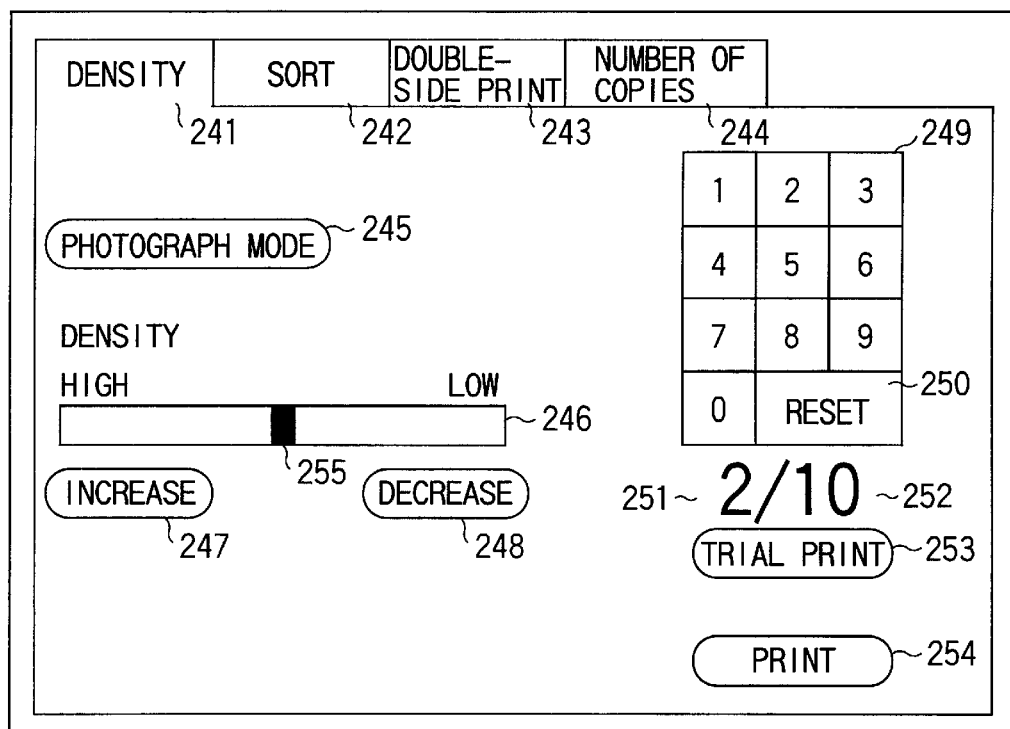
FIG. 14 is a diagram showing still another menu displayed on the display-input section of the control panel of the digital copier.

If the user has input a correct job number, the menu will change to the new one shown in FIG. 14. As shown in FIG.

14, the new menu consists of a density tab 241, a sort tab 242, a double-side print tab 243, and a copy number tab 244. While each of these tabs remains selected, the value for the tab can be set. FIG. 14 shows the case where the density tab 241 is selected. In this case, a photograph mode button 245, a density scale 246, a density-increasing button 247, a density-decreasing button 248, a ten-key pad 249, a reset button 250, a trial print page area 251, a total page number area 252, a trial print button 253, and a print button 254 are displayed in the menu.

The user may touch the photograph mode button 245 to print a document in photograph mode. The button 245 is displayed in reverse mode as long as it remains active.

On the density scale 246, a mark 255 indicates the density selected at present. The user may touch the density-increasing button 247 to shift the mark 255 toward the upper limit, thereby to increase the print density. Alternatively, the user may touch the density-decreasing button 248 to shift the mark 255 toward the lower limit, thereby to decrease the print density.

The ten-key pad 249 is provided for inputting a page number in the trial print page area 251 that is displayed below the ten-key pad 249. The number displayed in the trial print page area 251 is cleared when the reset key 250 is touched.

In the total page number area 252, the total page number of the document is displayed. The trial print button 253 is touched to print the page of the document, which is displayed in the trial print page area 251. When the button 253 is touched, the menu as shown in FIG. 14 does not change at all.

When the print button 254 is touched, all pages of the document are printed on paper sheets in accordance of the print values that have been set as described above. When the digital copier 1 finishes printing all pages of the document, the menu automatically changes back to the initial menu of FIG. 12.

Figure 15:
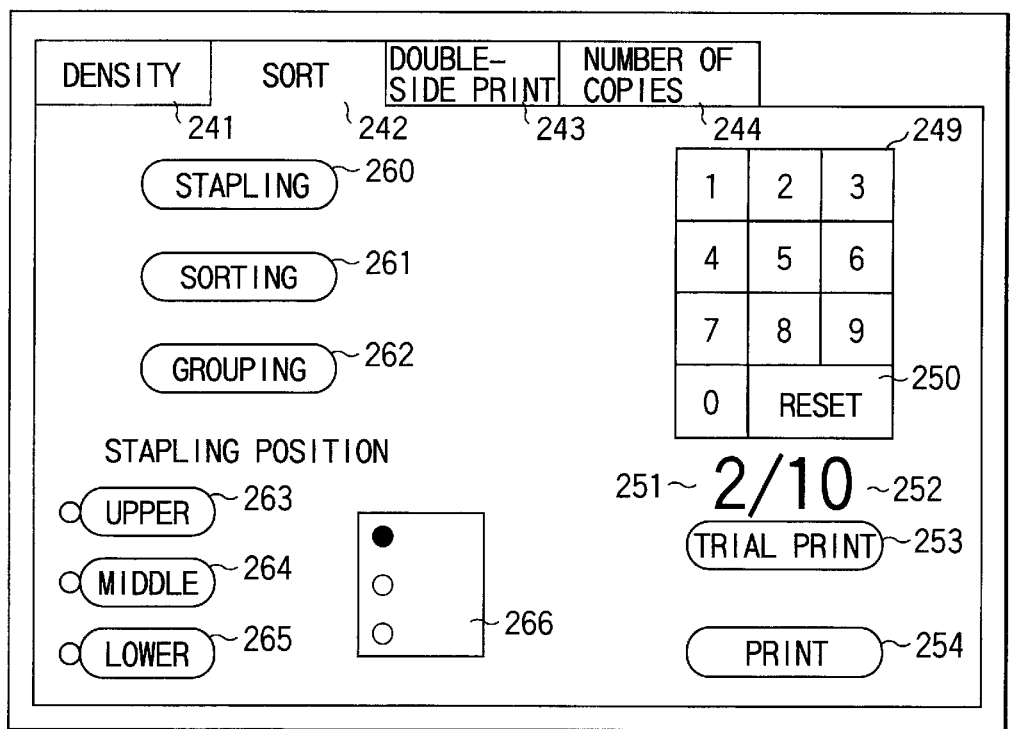
FIG. 15 is a diagram showing a different menu displayed on the display-input section of the control panel of the digital copier.

If the user selects the sort tab 242, the display-input section 20a will displays the menu shown in FIG. 15. This menu has a stable button 260, a sort button 261, a group button 262, an upper staple position button 263, a middle staple position button 264, a lower staple position button 265, a staple position area 266, a ten-key pad 249, a reset button 250, a trial print page area 251, a total page number area 252, a trial print button 253, and a print button 254.

The user may touch the staple button 260 to staple printed sheets into a copy of document. While the button 260 remains active, it is displayed in reverse mode, enabling the user to activate the upper staple position button 263, middle staple position button 264 and lower staple position button 265. If the upper staple position button 263 is activated, the copied sheets will be stapled at the upper margin. If the middle staple position button 264 is activated, the copied sheets will be stapled at the middle margin. If the lower staple position button 265 is activated, the copied sheets will be stapled at the lower margin. Only one staple position button can be activated at a time. The staple position selected is schematically indicated in the staple position area 266.

The user may touch the sort-button 261 to sort copied paper sheets into bins. The group button 262 is touched to sort copied sheets, thereby to make groups. The sort button 261 and the group button 262 cannot be selected at the same time. The ten-key pad 249, reset button 250, trial print page area 251, total page number area 252, trial print button 253 and print button 254 are identical in function to those displayed in the menu of FIG. 14.

Figure 16:
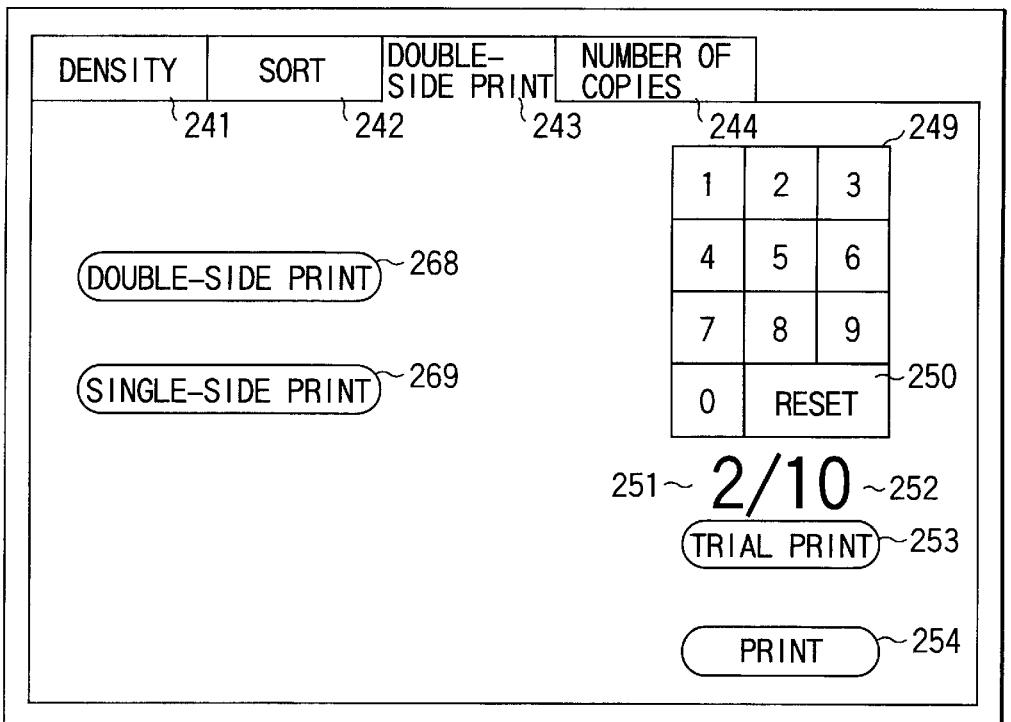
FIG. 16 is a diagram showing a menu displayed on the display-display section of the control panel of the digital copier.

If the user selects the double-side print tab 243, the display-input section 20a will displays the menu shown in FIG. 16. The menu has a double-side print button 268, a single-side print button 269, a ten-key pad 249, a reset button 250, a trial print page area 251, a total page number area 252, a trial print button 253, and a print button 254.

The user may touch the double-side print button 268 to print any two consecutive pages of data on the m two side of a paper sheet, respectively. Alternatively, the user may touch the single-side print button 269 to print each page of data on one side of a paper sheet.

The ten-key pad 249, reset button 250, trial print page area 251, total page number area 252, trial print button 253 and print button 254 are identical in function to those displayed in the menu of FIG. 14.

Figure 17:
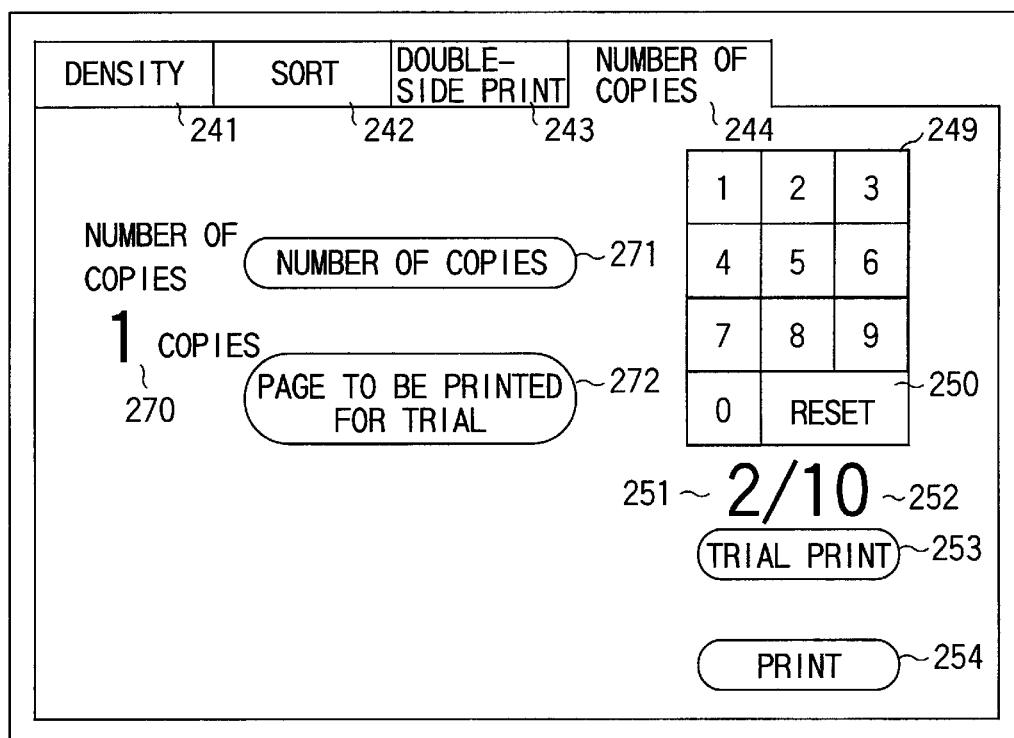
FIG. 17 is a diagram showing a different menu displayed on the display-input section of the control panel of the digital copier.

If the user selects the copy number tab 244, the display-input section 20a will displays the menu shown in FIG. 17. This menu has a copy number area 270, a copy number button 271, a trial print page button 272, a ten-key pad 249, a reset button 250, a trial print page area 251, a total page number area 252, a trial print button 253, and a print button 254.

While this menu remains displayed on the display-input section 20a, the user can set a desired number of copies. Once the copy number setting button 271 has been activated, the user can operate the ten-key pad 249 and can activate the reset button 250 to set any desired number of trial copies. The desired number of trial copies, set by operating the ten-key pad 249, is displayed in the copy number area 270. The user then touches the trial print page button 272, whereby he or she can operates the ten-key pad 249 and activate the reset button 250 to designate the page that should be printed for trial. As long as the trial print page button 272 remains active, the ten-key pad 249, reset button 250, trial print page area 251, total page number area 252, trial print button 253 and print button 254 function in the same way as those displayed in the menu of FIG. 14.

How the digital copier 1 operates while set in monochrome printing mode has been described above. Nonetheless, the digital copier can be set into color print mode. It will now be described how the copier 1 operates in the color-printing mode.

Figure 18:
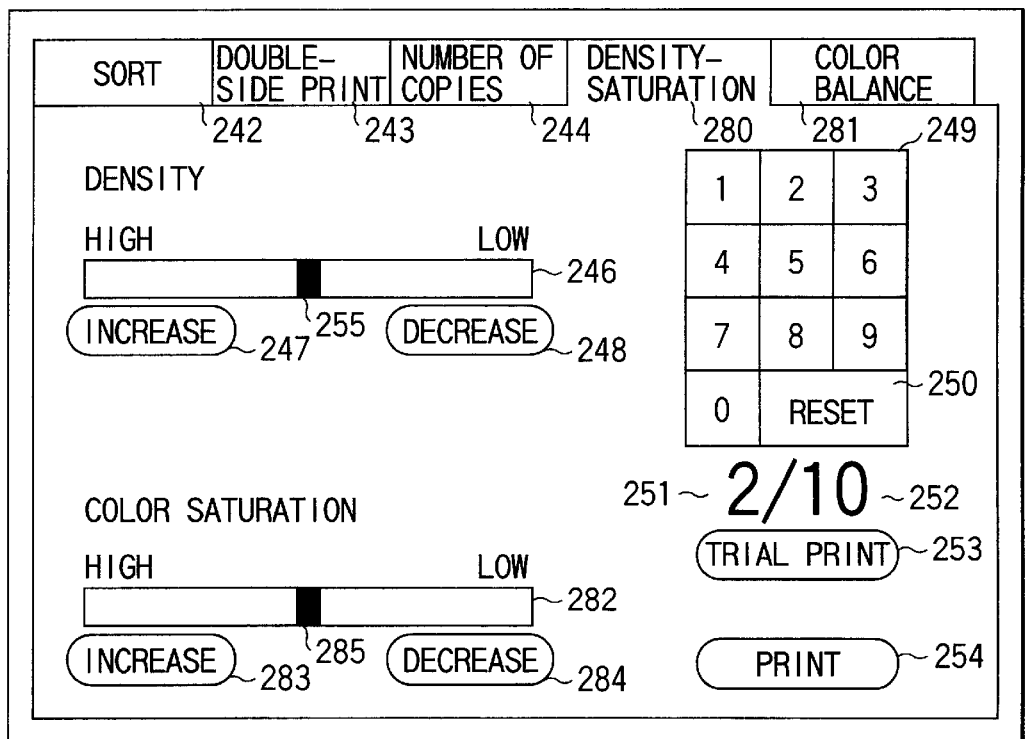
FIG. 18 is a diagram showing a menu displayed on the display-input section of the control panel of the digital copier.

When the user sets the copier 1 into color print mode, the menu shown in FIG. 18 is displayed on the display-input section 20a. The menu has a sort tab 242, a double-side print tab 243, a copy number tab 244, a density-saturation tab 280, and a color balance tab 281.

The menu shown in FIG. 18 is displayed while the density-saturation tab 280 remains selected. The menu further has a density scale 246, a density-increasing button 247, a density-decreasing button 248, a color saturation scale 282, a saturation-increasing button 283, a saturation-decreasing button 284, a ten-key pad 249, a reset button 250, a trial print page area 251, a total page number area 252, a trial print button 253, and a print button 254.

How the color saturation is set at a desired value will be explained below. The color saturation scale 282 has a mark 285 that indicates the color saturation set at present. The user may touch the saturation-increasing button 283 to shift the mark 285 toward the upper limit, thereby to increase the color saturation. Instead, the user may touch the saturation-decreasing button 284 to shift the mark 285 toward the lower limit, thereby to decrease the color saturation.

Figures 19, 20:
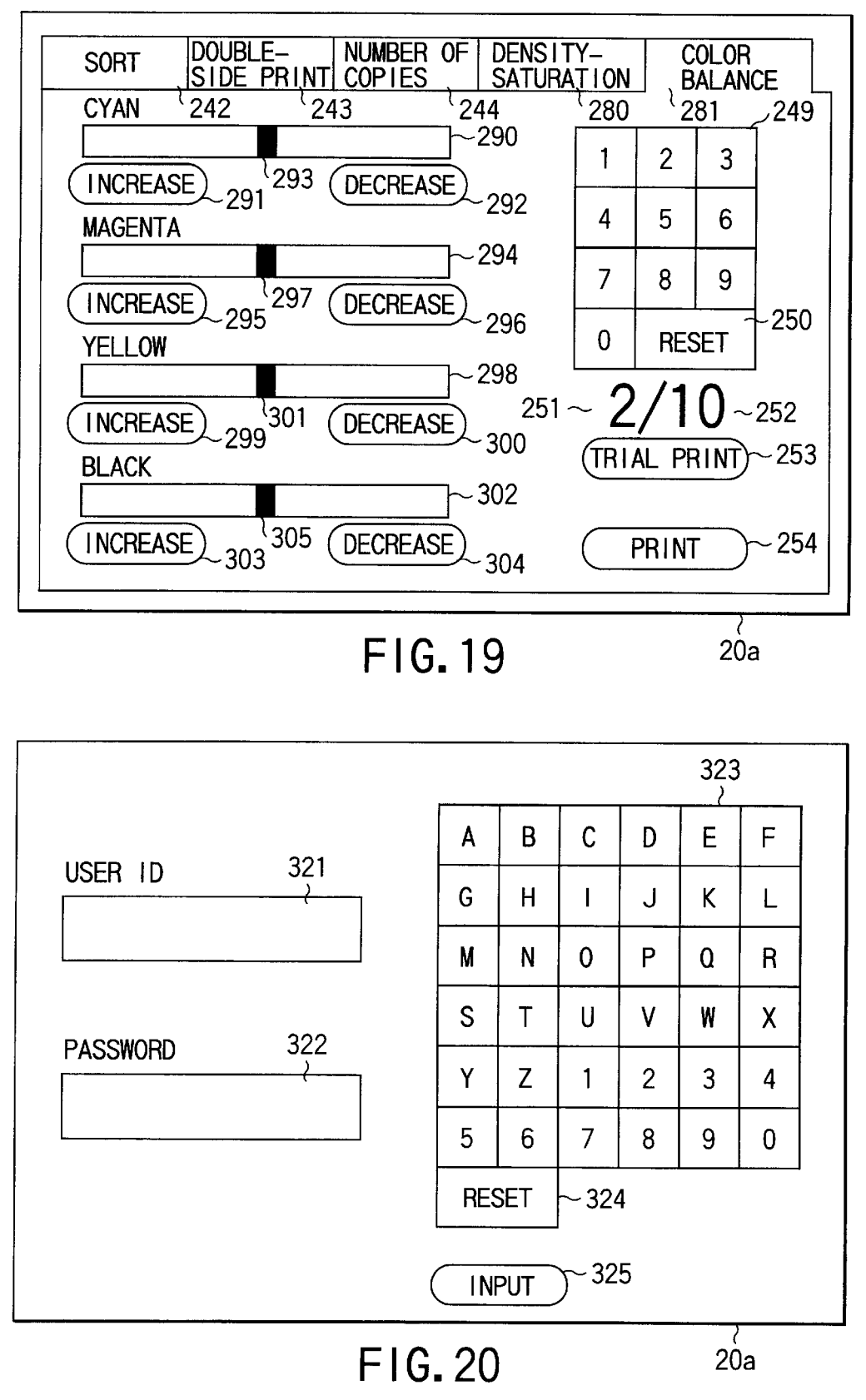

When the user touches the color balance tab 281 to adjust the color balance, the display-input section 20a displays the menu shown in FIG. 19. The menu of FIG. 19 has a cyan density scale 290, a cyan-density increasing button 291, a cyan-density decreasing button 292, a magenta density scale 294, a magenta-density increasing button 295, a magenta-density decreasing button 296, a yellow density scale 298, a yellow-density increasing scale 299, a yellow-density decreasing scale 300, a black density scale 302, a black-density increasing button 303, and a black-density decreasing button 304. The menu further has a ten-key pad 249, a reset button 250, a trial print page area 251, a total page number area 252, a trial print button 253, and a print button 254.

To adjust the cyan density, the user touches the cyan-density increasing button 291 or the cyan-density decreasing button 292, whereby a mark 293 moves on the cyan density scale 290. To adjust the magenta density, the user touches the magenta-density increasing button 295 or the magenta-density decreasing button 296 to adjust the magenta density, whereby a mark 297 moves on the magenta density scale 294. In order to adjust the yellow density, the user touches the yellow-density increasing button 299 or the magenta-density decreasing button 300 to adjust the magenta density, whereby a mark 301 moves on the yellow density scale 298. To adjust the black density, the user touches the yellow-density increasing button 299 or the magenta-density decreasing button 300 to adjust the magenta density, whereby a mark 301 moves on the yellow density scale 298.

While the display-input section 20a is displaying the initial menu shown in FIG. 12, the user may touch the job-deleting button 203 in order to delete the job from the queue management table 41.

In this case, the display-input section 20a displays the menu shown in FIG. 20, instead of the initial menu (FIG. 12). The menu of FIG. 20 has a user ID area 321, a password area 322, a character keypad 323, a reset button 324, and an input button 325.

At first, the user inputs his or her user ID in the area 321, by touching the selected keys of the character keypad 323. If the user makes a wrong user ID, he or she touches the reset button 324, thereby clearing the wrong user ID. After inputting the user ID in the area 321, the user touches the input button 325. The user then touches the selected keys of the character keypad 323, thereby inputting his or her password. The password is not displayed in the password area 322. Rather, a prescribed number asterisks (*) or underline bars (_) are displayed in the password area 322. After inputting password, the user touches the input button 325. If a wrong password has been input, the display-input section 20a will displays an error message. In this case, the user cannot user the digital copier 1.

If the user has input the correct password, the display-input section 20a will display a job deletion menu. For example, the section 20a displays the job deletion menu for user B, which is shown in FIG. 21. As shown in FIG. 21, the menu has a user name area 330, a job list area 331, and a deletion button 332. The jobs which user B has performed and which are recorded in the queue management table 41 are displayed in the job list area 331. Seeing these jobs displayed in the area 331, User B touches any job he or she wishes to delete. Then, the job thus selected is displayed in reverse mode. When user B touches the deletion button 332, the job selected is deleted.

The second embodiment of the present invention will be described.

In the second embodiment, the print values, which have been set in any personal computer (PC 2, PC 3) shown in FIG. 1 to make a print request to the digital copier 1, are stored in the personal computer. If the print values are changed in the digital copier 1 to new values, the new print values are transmitted to the personal computer. Hence, the same file can be printed again in the new print values, even if some of the print values, such as print density, are altered to print the file for trial.

The print driver provided in the personal computer (PC 2, PC 3) that makes a print request has the driver management table 340 shown in FIG. 22 to store the print values. The driver management table 340 is recorded on a hard disk (not shown) provided in the personal computer (PC 2, PC 3). The driver management table 340 provided in, for example, PC 2 will be described.

As shown in FIG. 22, the driver management table 340 consists of a path/file name field 350, an issue date field 351, a document name field 352, and a set value field 353.

The paths and file names on the PC 2 are recorded in the path/file name field 350, so that the files containing the documents, for which a print request has been made, may be identified. The date of making the print request is recorded in the issue date field 351. The name of the document is recorded in the document name field 352. And the print values set, such as the density, are recorded in the set value field 353.

When the driver management table 340 becomes full of data, the old data is erased from the issue date field 351 and new data is stored therein. Thus, the print driver provided in the PC 2 holds the data set when the print request is made in the PC 2.

FIG. 23 illustrates the queue management table 400 provided in the digital copier 1. As FIG. 23 shows, the table 400 consists of a queue order field 354, a trial print mode field 355, a trial preceding mode field 356, a page field 357, a user ID field 358, a job number field 359, a document name field 360, a state field 361, a receipt date-time field 362, a PC address field 363, and a file pointer field 364. The queue management table 400 is recorded, for example, on the hard disk provided in the digital copier 1.

This table 400 differs from the queue management table 41 used in the first embodiment, only in that it has an additional field, i.e., the PC address field 363. Therefore, the other fields of the table 400 will not be described.

In the PC address field 363, the address of any PC that has sent a print job to the digital copier 1. The header of any data packet transmitted via the LAN usually contains the source address and the destination address. Thus, the address of the PC is acquired from the header of the data packet and is recorded in the PC address field 363.

Then, in Step S39 (FIG. 9), the various print values are changed. More precisely, the address of the PC which has sent the job is read from the queue management table 400 after all pages of the image data are printed in Step S42. The digital copier 1 transmits the data representing the print values to the PC having this address. Upon receipt of this data from the copier 1, the print driver provided in the PC writes the data in the set value field 353 of the driver management table 340, deleting the data that has recorded therein before.

The print values set for the file and changed in the PC to achieve trial printing in the digital copier 1 can thereby be restored to ones initially set in the copier 1 for the file. Hence, the file can be printed again in the print values set in the digital copier 1.

As has been described, the embodiments of the present invention enable the user of a personal computer connected to a LAN to reset print instructions easily at the printer or digital copier connected to the LAN, thereby to get printed sheets of the quality he or she desires.

As has been described in detail, the present invention can provide a printing apparatus and a printing system, which comprises at least one printer and a plurality of personal computers and which enables each user to reset print instructions at the printer to get printed sheets of the quality he or she desires.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus for performing a trial preceding print, comprising:

receiving means for receiving a plurality of pages of image data transmitted through a communication line and receiving a trial preceding print request signal which requests printing only a portion of the plurality of pages of image data immediately without an additional instruction;

first printing means for performing the trial preceding print by printing said portion of the plurality of pages of image data received immediately in response to the trial preceding print request signal, without the additional instruction;

setting means for setting a desirable specification by operating a control panel after the trial preceding print; and second printing means for printing all of the plurality of pages of image data received by the receiving means, in the desirable specification set by the setting means.

2. An image forming apparatus according to claim 1, further comprising:

a storage means for storing the image data and the trial preceding print request signal both received at the receiving means; and wherein the first printing means prints said portion of the plurality of pages of image data in response to the trial preceding print request signal stored in the storage means, wherein the second printing means prints all of the plurality of pages of image data upon receiving an all-page print instruction from a user through the control panel; and transfer means for transferring data representing the desirable specification to a data processing device which has transmitted the image data to the image forming apparatus through a communication line, after the second printing means has printed all of the plurality of pages of image data.

3. An image forming apparatus according to claim 1, further comprising:

a storage means for storing the image data and the trial preceding print request signal both received at the receiving means; and wherein the first printing means prints said portion of the plurality of pages of image data, in color, in response to the trial preceding print request signal stored in the storage means; and wherein the second printing means prints all of the plurality of pages of image data, in color, upon receiving an all page print instruction from a user through the control panel, after the first printing means has printed said portion of the plurality of pages in color.

4. An image forming system comprising:

a plurality of data processing devices for transferring image data to be printed and a trial preceding print request signal which requests printing only a portion of a plurality of pages of image data immediately without an additional instruction; and a printer apparatus having:

receiving means for receiving a plurality of pages of the image data and the trial preceding print request signal from the plurality of data processing devices through a communication line;

first printing means for performing a trial preceding print by printing said portion of the plurality of pages of image data received immediately in response to the trial preceding print request signal, without the additional instruction;

setting means for setting a desirable specification by operating a control panel after the trial preceding print; and second printing means for printing all of the plurality of pages of image data received by the receiving means, in the desirable specification set by the setting means.

5. An image forming apparatus for performing a trial preceding print, comprising:

a receiver that receives a plurality of pages of image data transmitted through a communication line and receives a trial preceding print request signal that requires printing only a portion of the plurality of pages of image data immediately without an additional instruction;

a printer configured to perform a trial preceding print by printing said portion of the plurality of pages of image data received in response to the trial preceding print request signal, without the additional instruction; and a controller that sells a desired specification by operating a control panel after the trial preceding print, wherein the printer is further configured to print all the plurality of pages of image data received by the receiver, according to the desired specification set by the controller.

6. An image forming apparatus according to claim 5, further comprising:

a memory that is configured to store the image data and the trial preceding print request signal both received at the receiver;

wherein the printer prints said portion of the plurality of pages of image data in response to the trial preceding print request signal stored in the memory, wherein the printer prints all of the plurality of pages of image data upon receiving an all-page print instruction; and a data transfer unit that transfers data representing the desired specification to a data processing device which has transmitted the image data to the image forming apparatus through said communication line, after the printer has printed all of the plurality of pages of image data.

7. An image forming apparatus according to claim 5, further comprising:

a memory that stores the image data and the trial preceding print request signal both received at the receiver;

wherein the printer prints said portion of the plurality of pages of image data, in color, in response to the trial preceding print request signal stored in the memory; and wherein the printer prints all of the plurality of pages of image data, in color, upon receiving an all page print instruction from a user through the control panel, after the printer has printed said portion of the plurality of pages of color.

8. An image forming system comprising:

a plurality of data processors that transfer image data to be printed and a trial preceding print request signal which requests printing only a portion of a plurality of pages of image data immediately without an additional instruction; and a printer apparatus having:
   a receiver that receives a plurality of pages of the image data and the trial preceding print request signal from the plurality of data processors devices through a communication line;
   a printer that performs a trial preceding print by printing said portion of the plurality of pages of image data received immediately in response to the trial preceding print request signal, without the additional instruction; and
   a controller that sets a desired specification by operation of a control panel after the trial preceding print;
   wherein the printer prints all of the plurality of pages of image data received by the receiver, according to the desired specification set by the controller.

9. An image forming apparatus for performing a trial preceding print, comprising:

receiving means for receiving a trial preceding print request signal which requests printing a page of image data without an additional instruction;

first printing means for performing a trial preceding print by printing the page of image data in response to the trial preceding print request signal without the additional instruction;

setting means for setting a desirable specification by operating a control panel after the trial preceding print; and second printing means for printing the page of image data in the desirable specification set by the setting means.

10. An image forming apparatus according to claim 9, further comprising:

a receiver for receiving the page of image data transmitted through a communication line.

11. An image forming apparatus according to claim 10, further comprising:

a storage means for storing the page of image data and the trial preceding print request signal; and wherein the first printing means prints the page of image data in response to the trial preceding print request signal stored in the storage means, wherein the second printing means prints the page of image data upon receiving a print instruction from a user through the control panel; and transfer means for transferring data representing the desirable specification to a data processing device which has transmitted the page of image data to the image forming apparatus through said communication line, after the second printing means has printed the page of image data.

12. An image forming apparatus as recited in claim 9, further comprising a memory for storing said page of image data.

13. An image forming apparatus as recited in claim 12, further comprising a scanner for scanning an original page to obtain a digital image thereof as said page of image data.

14. An image forming apparatus according to claim 9, further comprising:

a storage means for storing the page of image data and the trial preceding print request signal; and wherein the first printing means prints the page of image data, in color, in response to the trial preceding print request signal stored in the storage means; and wherein the second printing means prints the page of image data, in color, upon receiving a print instruction from a user through the control panel, after the first printing means has printed the page of image data in color.

15. An image forming system comprising:

a trial preceding print request signal which requests printing a page of image data without an additional instruction; and a printer apparatus having:
   receiving means for receiving the page of image data and the trial preceding print request signal;
   first printing means for performing a trial preceding print by printing the page of image data received by the receiving means in response to the trial preceding print request signal without the additional instruction;
   setting means for setting a desirable specification by operating a control panel after the trial preceding print; and
   second printing means for printing the page of image data received by the receiving means in the desirable specification set by the setting means.

16. A process for performing a trial preceding print in an image forming apparatus, comprising:

receiving a trial preceding print request signal which requests printing a page of image data without an additional instruction;

performing a trial preceding print by printing the page of image data in response to the trial preceding print request without the additional instruction;

setting a desirable specification through a control panel after the trial preceding print; and printing the page of image data in the desirable specification.

17. A process according to claim 16, further comprising:

receiving the page of image data through a communication line.

18. A process according to claim 16, further comprising:

storing the page of image data and the trial preceding print request signal; and transferring data representing the desirable specification to a data processing device which has transmitted the page of image data to the image forming apparatus through the communication line after printing the page of image data in the desirable specification, wherein the page of image data is printed in response to the stored trial preceding print request signal, and wherein the page of image data is printed in the desirable specification upon receiving a print instruction from a user through the control panel.

19. A process according to claim 16, further comprising:

storing the page of image data and the trial preceding print request signal, wherein the page of image data is printed in color in response to the stored trial preceding print request signal; and wherein the page of image data is printed in color upon receiving a print instruction input through the control panel after the page has been printed in color in response to the stored trial preceding print request signal.

20. An image forming apparatus for performing a trial preceding print, comprising:

receiving means for receiving a trial preceding print request signal which requests printing a page of image data without an additional instruction;

printing means for performing the trial preceding print by printing said page of image data received in response to the trial preceding print request signal, without the additional instruction;

setting means for setting a desirable specification by operating a control panel after the trial preceding print; and said printing means, operative in response to a print command, for printing the page of image data received by the receiving means, in the desirable specification set by the setting means.

21. An image forming apparatus according to claim 20, further comprising:

a receiver for receiving the page of image data transmitted through a communication line.

22. An image forming apparatus according to claim 21, further comprising:

a storage means for storing the page of image data and the trial preceding print request signal; and wherein the printing means prints the page of image data in response to the trial preceding print request signal stored in the storage means, and prints the page of image data upon receiving a print instruction from a user through the control panel; and transfer means for transferring data representing the desirable specification to a data processing device which has transmitted the page of image data to the image forming apparatus through said communication line, after the printing means has printed the page of image data.

23. An image forming apparatus as recited in claim 20, further comprising a memory for storing said page of image data.

24. An image forming apparatus as recited in claim 23, further comprising a scanner for scanning an original page to obtain a digital image thereof as said page of image data.

25. An image forming apparatus according to claim 20, further comprising:

a storage means for storing the page of image data and the trial preceding print request signal; and wherein the printing means prints the page of image data, in color, in response to the trial preceding print request signal stored in the storage means, and prints the page of image data, in color, upon receiving a print instruction from a user through the control panel, after printing the page of image data in color.

26. An image forming system comprising:

a receiver that receives a page of image data and a trial preceding print request signal;

a printer that performs a trial preceding print by printing the page of image data in response to the trial preceding print request signal without an additional instruction; and a controller that sets a desired specification by operation of a control panel after the trial preceding print;

wherein the printer prints the page of image data according to the desired specification set by the controller.

27. An image forming system according to claim 26, further comprising a plurality of data processors that transfer image data to be printed and the trial preceding print request signal, which requests printing the page of image data without an additional instruction.

28. An image forming system according to claim 26, further comprising:

a storage unit that stores the page of image data and the trial preceding print request signal, wherein the printer prints the page of image data in response to the trial preceding print request signal stored in the storage unit, and prints the page of image data upon receiving a print instruction from a user through the control panel.

29. An image forming system as recited in claim 26, further comprising a memory for storing said page of image data.

30. An image forming system as recited in claim 29, further comprising a scanner for scanning an original page to obtain a digital image thereof as said page of image data.

31. An image forming system comprising:

a trial preceding print request signal which requests printing a page of image data without an additional instruction; and a printer apparatus having:

a receiver that receives the page of image data and the trial preceding print request signal;

a printer that performs a trial preceding print by printing the page of image data received by the receiver in response to the trial preceding print request signal without the additional instruction; and a controller that sets a desirable specification through operation of a control panel after the trial preceding print, wherein the printer prints the page of image data received by the receiver in the desirable specification set by the controller.

* * * * *